(No Model.)

C. LA DOW.
HARROW.

No. 501,887. Patented July 18, 1893.

Witnesses,
Sidney P. Hollingsworth
P. Washington Miller

Inventor,
Charles La Dow
by his attorneys,
Baldwin Davidson & Wight

UNITED STATES PATENT OFFICE.

CHARLES LA DOW, OF ALBANY, NEW YORK.

HARROW.

SPECIFICATION forming part of Letters Patent No. 501,887, dated July 18, 1893.

Application filed December 29, 1892. Serial No. 456,681. (No model.)

*To all whom it may concern:*

Be it known that I, CHARLES LA DOW, a citizen of the United States, residing at Albany, in the county of Albany and State of New York, have invented certain new and useful Improvements in Harrows, of which the following is a specification.

My invention relates particularly to harrows in which circular teeth are adjustable about their hinge connections with the harrow frame to vary the pitch or depth of cut of their working ends.

My invention involves improved devices for adjusting each tooth and also for adjusting two or more teeth simultaneously.

My invention also comprehends an improved frame made in sections, and so organized that one or more frame sections may be readily detached from a connecting bar or device.

The details of construction and the subject-matter claimed are hereinafter set forth.

The accompanying drawings show one way of embodying my improvements, but I wish it distinctly understood that I am not limited to this particular way, as my invention involves certain broad features which may be embodied in harrows or harrow frames of widely different construction.

Figure 1:
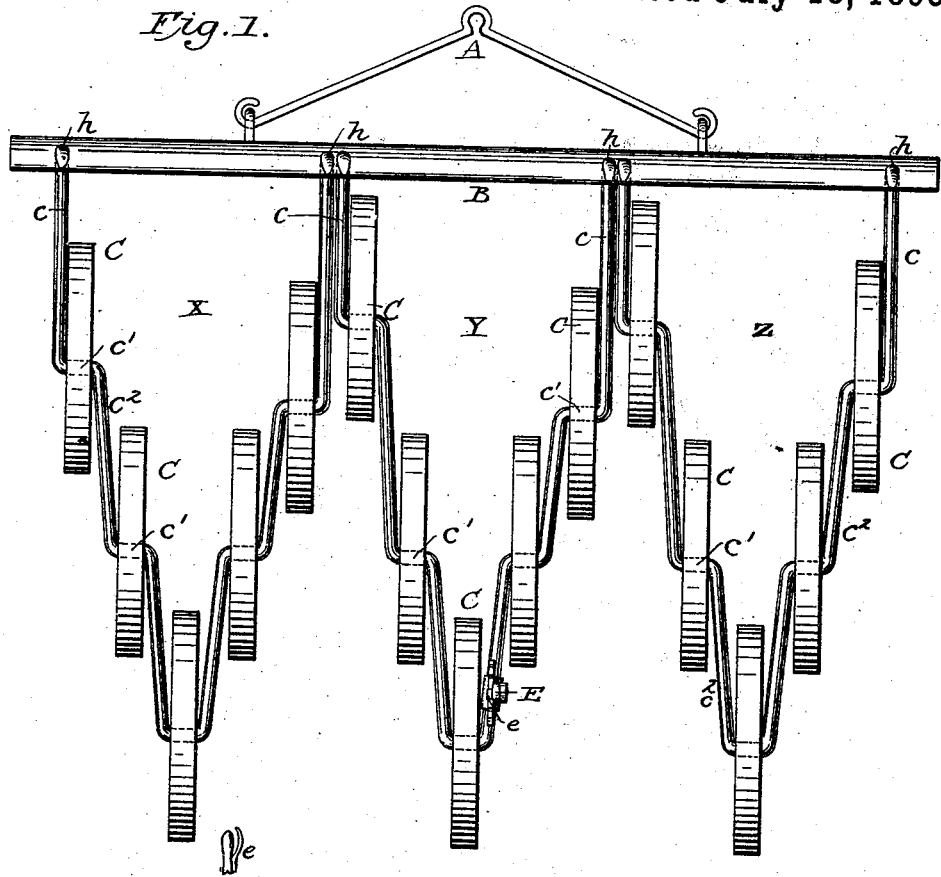
Figure 2:
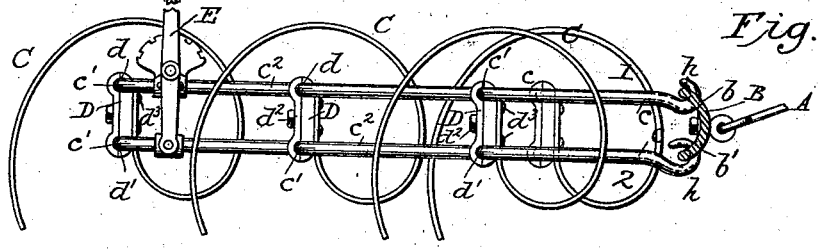
Figure 3:
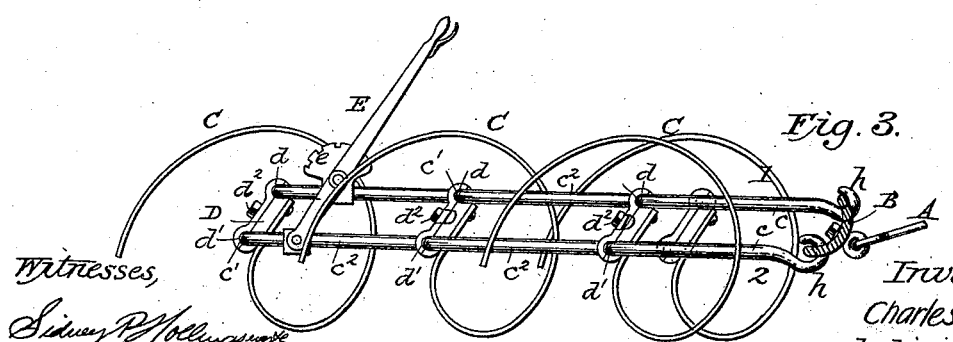

Figure 1 is a plan view of a harrow with my improvements applied. Fig. 2 is a side elevation thereof with the teeth in working position to dig the soil. Fig. 3 is a similar view with the teeth elevated.

Draft devices A, which may be of any desired construction, are in this instance attached to a front draft bar B, which, as indicated, may be of metal of concavo-convex form and having upper and lower perforations $b\ b'$, at suitable intervals apart for the attachment of the frame bars which support the teeth.

I have shown in the drawings, upper and lower bars 1 and 2, each consisting of three sections X, Y and Z. They are all substantially the same size, shape and construction. Each frame is provided with two limbs $x\ x'$, $y\ y'$, $z\ z'$. Each pair of limbs of each duplicate frame section, is connected at the rear preferably by being formed integrally with each other, and at the front of the limbs are formed with hooked ends $h$, adapted to engage with the perforations in the draft bar B. Each limb of each section is arranged to hold the teeth C, in zig-zag lines so that they may work the soil at suitable intervals apart in different draft lines. Preferably, each limb is provided with a straight portion $c$, parallel with the line of draft, a series of steps or offsets $c'$, at right angles with the line of draft, and connecting portions $c^2$, oblique to the line of draft. The frame sections are arranged compactly together and are adapted to rise and fall by flexing at their connection with the draft bar B, and the connection is such that by raising one or more of the frame sections to the desired extent, it may be separated from the draft bar by simply unhooking the fastening devices, and this may be done without disturbing the other frame sections. The teeth C, as shown, are curved spring teeth of the Garver type and their shanks are connected in any suitable way, such as by bolts $d^2$, as shown, to the arms D, which are encircled by the teeth. When the arms are in a vertical position, as indicated in Fig. 2, they hold the duplicate frames apart and the teeth are in position to work the soil. When the arms are inclined, as shown in Fig. 3, they move the teeth correspondingly and the parallel portions of the duplicate frame sections are brought closer together and this effects the raising of the teeth out of the soil, as shown in Fig. 3, and when in this position, trash, &c., may readily be stripped from the teeth and left behind, as the harrow proceeds with its work.

Any suitable means may be employed for effecting the adjustment of the teeth. I have shown one simple way which consists in employing a lever E, provided with a detent mechanism $e$, and attached to the two portions of the duplicate frames in a section, as indicated. By adjusting this lever, the arms may be tilted or inclined, and the teeth correspondingly adjusted to vary their pitch or depth of cut. The adjustment of the frame bars in one section will tilt or adjust the draft bar B and consequently a similar adjustment of the teeth will occur in the other sections.

I do not wish to limit myself to the particular form of arm attached to the teeth nor to any construction of frame for the teeth, for, so far as I am aware, I am the first to use an arm attached to and encircled by a curved tooth, and am also the first to adjust a curved tooth by attaching it to two bars flexibly connected together, so that by the movement of one bar relatively to the other, the tooth may be adjusted. In the claims, I have pointed out and stated what I deemed to be novel, and as of my own invention, and do not wish to limit myself to the statements of the particular construction described in this specification.

I have shown round frame bars, but they may be angular or of any suitable construction. It will be observed that the curved teeth are adjustable about centers or pivots at right angles to the line of draft, so that when the curved teeth are rocked, their front bow portions and their rear soil-working portions are maintained in line with the draft, so that when the front bows of the teeth are rocked forward and on to the ground, said portions of the teeth do not cross the line of draft, but leave all space open across the harrow except that occupied by the width of the metal of which the teeth are composed, so that rubbish and clods and stones may work out backwardly from among the teeth when their points are simultaneously raised from the ground. Substantially the entire length of the teeth are rendered vibratory by reason of their arms which are encircled by the teeth, and which are doubly pivoted to the frame bars, so that the backward and forward movement of the bars not only acts on said arms and the double pivots to adjust the pitch of the teeth, but this method of fastening the teeth renders them more vibratory than others and also prevents them from wabbling.

I claim as my invention—

1. In a harrow a frame having upper and lower bars adapted to be moved backwardly and forwardly relatively to each other and a C-shaped tooth hinged to each of said bars, in combination with lever devices whereby the upper hinges of several teeth may be simultaneously moved backwardly or forwardly and thereby simultaneously vary the position of the front bow portion of several teeth relatively to said hinges, substantially as described.

2. In a harrow a frame whose bars form openings between them, C-shaped teeth hinged separately to the bars or to a device on the bars at or near the ends of said openings and operatively connected together so that the front bow portions of different teeth may be simultaneously moved backwardly or forwardly relatively to their hinge connections, in combination with means for moving said teeth substantially as described.

3. A harrow having a draft bar provided with openings, upper and lower bars having hooks entering said openings, and teeth carried by the upper and lower bars, the organization being such that by lifting the upper and lower bars they may be unhinged from their draft bar.

4. In a harrow, a bar, and a curved tooth hinged thereto, in combination with a second bar, also hinged to the tooth and adapted to reach around the front curved portion thereof so as to be hinged to an arm located within the circle of the tooth and to then extend rearwardly past the digging end of the tooth.

5. In a harrow, upper and lower bars adapted to be moved backwardly and forwardly relatively to each other to adjust the position of the teeth in combination with curved spring teeth having arms within their circles and in rear of their front bow portions, and connected flexibly to the upper and lower bars, whereby substantially the whole length of each tooth is left vibratory and wabbling of the teeth is prevented.

In testimony whereof I have hereunto subscribed my name.

CHARLES LA DOW.

Witnesses:
CHARLES A. NEVILLE,
GEORGE A. MURRAY.